United States Patent [19]
Minick

[11] Patent Number: 5,848,459
[45] Date of Patent: Dec. 15, 1998

[54] PALLET END BOARD REMOVER

[75] Inventor: Juston Minick, 6910 Fourche Dam Pike, Little Rock, Ark. 72206

[73] Assignee: Juston Minick, Little Rock, Ark.

[21] Appl. No.: 651,391

[22] Filed: May 22, 1996

[51] Int. Cl.$^6$ .................................................. B23P 19/00
[52] U.S. Cl. .............................. 29/426.5; 29/239; 29/252
[58] Field of Search .......................... 29/239, 252, 403.3, 29/426.4, 426.5

[56] References Cited

U.S. PATENT DOCUMENTS

| | | |
|---|---|---|
| 2,593,843 | 4/1952 | Cannon . |
| 3,512,242 | 5/1970 | Harvis ........................................ 29/252 |
| 3,740,815 | 6/1973 | Campbell et al. . |
| 3,846,890 | 11/1974 | Bielkiewicz . |
| 3,869,783 | 3/1975 | Spencer ..................................... 29/252 |
| 3,899,816 | 8/1975 | Jennings ..................................... 29/252 |
| 4,089,098 | 5/1978 | DeMarco . |
| 4,112,578 | 9/1978 | Sanford . |
| 4,285,110 | 8/1981 | Fagre, Jr. . |
| 4,320,570 | 3/1982 | Williams . |
| 4,586,235 | 5/1986 | Benvenuto . |
| 4,649,617 | 3/1987 | Hufnagel . |
| 4,757,599 | 7/1988 | Bane . |
| 4,845,825 | 7/1989 | Gleason . |
| 4,947,530 | 8/1990 | Gleason . |
| 5,201,110 | 4/1993 | Bane . |
| 5,243,741 | 9/1993 | Fudaki et al. . |
| 5,457,869 | 10/1995 | Doyle . |
| 5,463,808 | 11/1995 | Harris ..................................... 29/426.5 |
| 5,467,516 | 11/1995 | DeGeorge . |
| 5,600,882 | 2/1997 | Beane . |

OTHER PUBLICATIONS

Clipper advertisement, Pallet Enterprises, Apr. 1995, p. 7.
Deckmaster advertisement, Pallet Enterprises, Apr. 1995, p. 53.
Viking advertisement, Pallet Enterprises, May 1995, p. 17.

Primary Examiner—James F. Coan
Assistant Examiner—Eugene L. Kim
Attorney, Agent, or Firm—Mark A. Rogers; Gary N. Speed; Mark M. Henry

[57] ABSTRACT

An apparatus and method for removing an end board from a pallet are disclosed which use a surface for supporting a pallet, a plurality of arms pivotally secured to the surface, a restraining bar pivotally secured to the surface and a power source operatively connected to the arms and restraining bar for rotating the arms and restraining bar from a first position for receiving an end board of a pallet to a second position for prying the end board from the pallet. The surface will typically be a table, and the arms and restraining bar may be pivotally secured to the table by one or more sides that are pivotally secured to the table, so that the arms and restraining bar rotate about the same axis relative to the table. This axis of rotation of the arms and restraining bar may be disposed between front and rear ends of the table and above the table surface, so that the arms may extend substantially horizontally between the front end of the table and the axis. The arms may also have upper and lower members disposed to receive an end board therebetween.

17 Claims, 4 Drawing Sheets

PALLET END BOARD REMOVER

BACKGROUND OF THE INVENTION

The present invention relates to an apparatus and method of pallet repair and recycling and more particularly to an apparatus and method for disassembling pallets.

Pallets are commonly used in large numbers for storing and shipping of goods. Pallets are typically made of wood but may be made of any number of materials. A pallet typically has bottom and top layers of separated, flat parallel boards or slats all of which are nailed to boards or slats, called stringers. The stringers extend parallel to each and other and perpendicular to the boards forming the top and bottom layers. Three stringers are typically used, two extending along and near two opposing sides of a pallet and one extending along the center of the pallet. The stringers are typically four to six inches high to permit forks of a forklift, pallet jack or similar pallet moving device to be placed between the top and bottom layers of boards to lift materials placed on the pallet.

Although pallets are typically rugged, pallets are often reused several times, and the harsh environments in which they are used eventually leads to damage to many, if not most, the pallets. Because of the need to handle large volumes of pallets in the pallet repair and recycling business, equipment is commonly used to make disassembly and repair faster and easier. The most commonly damaged part of a pallet is an end board located on the top or bottom layer on the front or back end of the pallet, so specialized equipment has been developed to quickly and easily remove end boards. Although such devices have a number of advantages, they are not without problems. For example, the devices typically require careful placement and alignment of the pallets and often require extra steps to restrain a pallet before the end board may be removed. As a result, these devices typically have long cycle times for removing end boards, in the range of 7 to 9 seconds. Further, these devices are typically of complex construction, making them costly and complicated to manufacture and use. The added complexity also makes them less rugged and reliable and more difficult to repair.

SUMMARY OF THE INVENTION

It is therefore an object of the present invention to provide an apparatus and method of removing an end board from a pallet quickly and easily.

It is a further object of the present invention to provide an apparatus and method of the above type in which the machinery used is of a simple, inexpensive design and rugged construction.

It is a still further object of the present invention to provide an apparatus and method of the above type in which extra steps are not needed to restrain a pallet before the end board is removed.

It is a still further object of the present invention to provide an apparatus and method of the above type in which prying arms and a restraining bar are rotated from a first position to a second position to pry an end board from a pallet.

It is a still further object of the present invention to provide an apparatus and method of the above type in which the prying arms and restraining bar are powered by a pneumatic cylinder for short cycle times.

It is a still further object of the present invention to provide an apparatus and method of the above type which makes use of equipment of compact design.

It is a still further object of the present invention to provide an apparatus and method of the above type which permits an end board to be removed with a cycle time of approximately two seconds.

Toward the fulfillment of these and other objects and advantages, the pallet end board remover of the present invention comprises a surface for supporting a pallet, a plurality of arms pivotally secured to the surface, a restraining bar pivotally secured to the surface and a power source operatively connected to the arms and restraining bar for rotating the arms and restraining bar from a first position for receiving an end board of a pallet to a second position for prying the end board from the pallet. The surface will typically be a table, and the arms and restraining bar may be pivotally secured to the table by one or more sides that are pivotally secured to the table, so that the arms and restraining bar rotate about the same axis relative to the table. This axis of rotation of the arms and restraining bar may be disposed remotely from an end of the table and above the table surface, so that the arms may extend substantially horizontally between the end of the table and the axis. The arms may also have upper and lower members disposed to receive an end board therebetween.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIG. 1 is a perspective view of an end board remover embodying the present invention, in a first, lowered position;

Figures 3, 4:
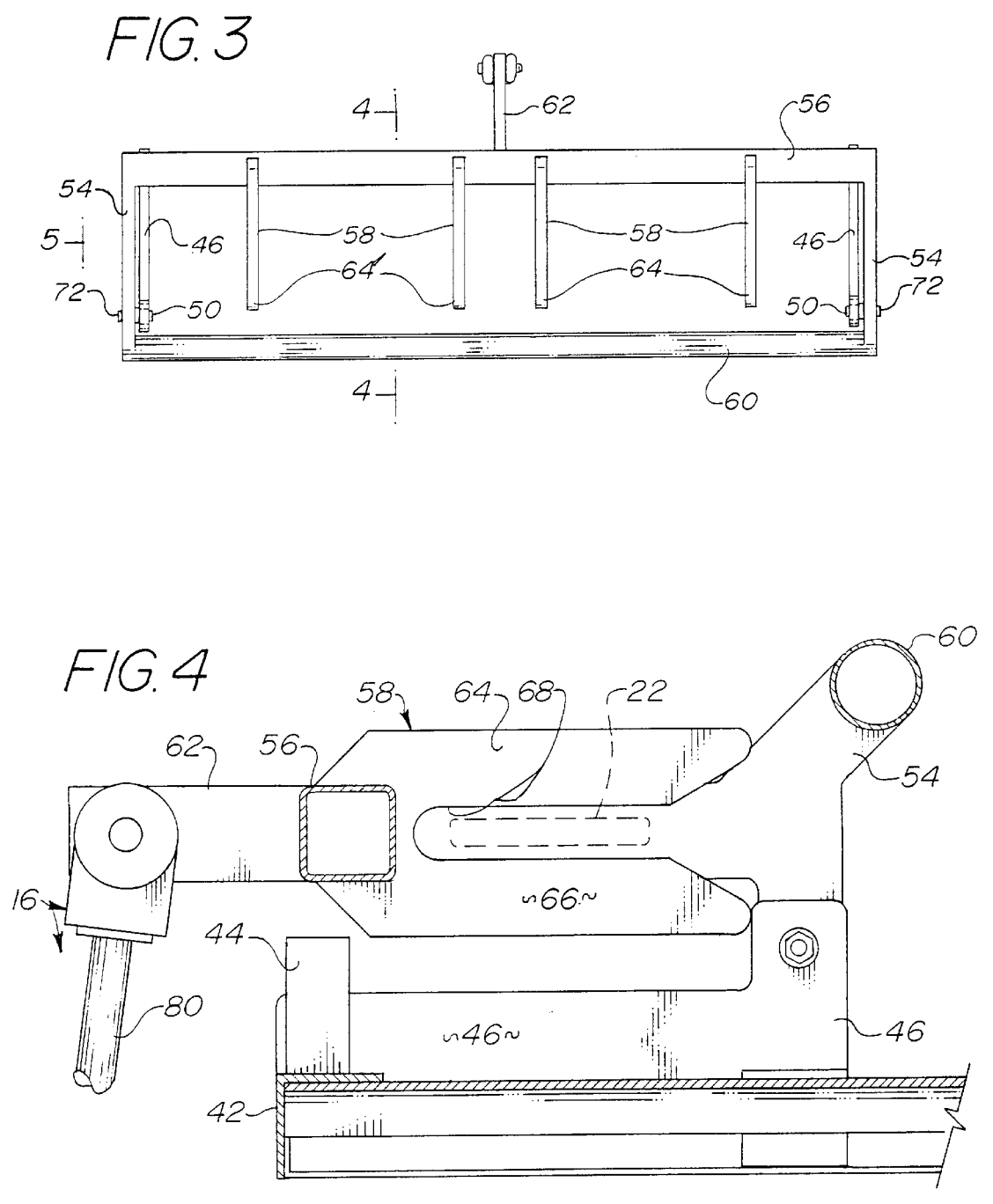

FIG. 3 is a top, partial view of an apparatus of the present;

FIG. 4 is a partial, enlarged, sectional side elevational view of an end board remover of the present invention, taken along lines 4—4 of Fig.

DETAILED DESCRIPTION OF THE PREFERRED EMBODIMENTS

Figure 1:
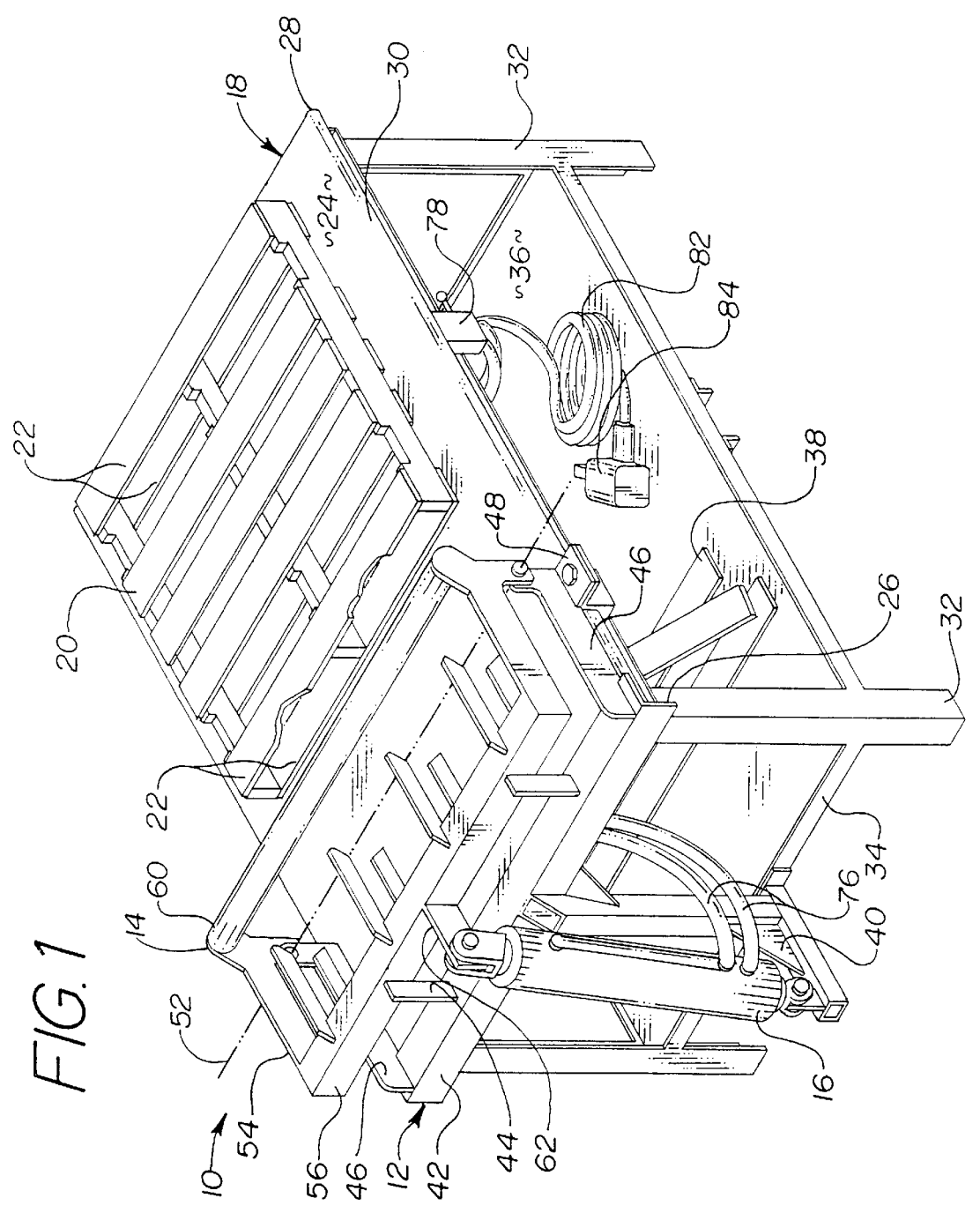
Figure 2:
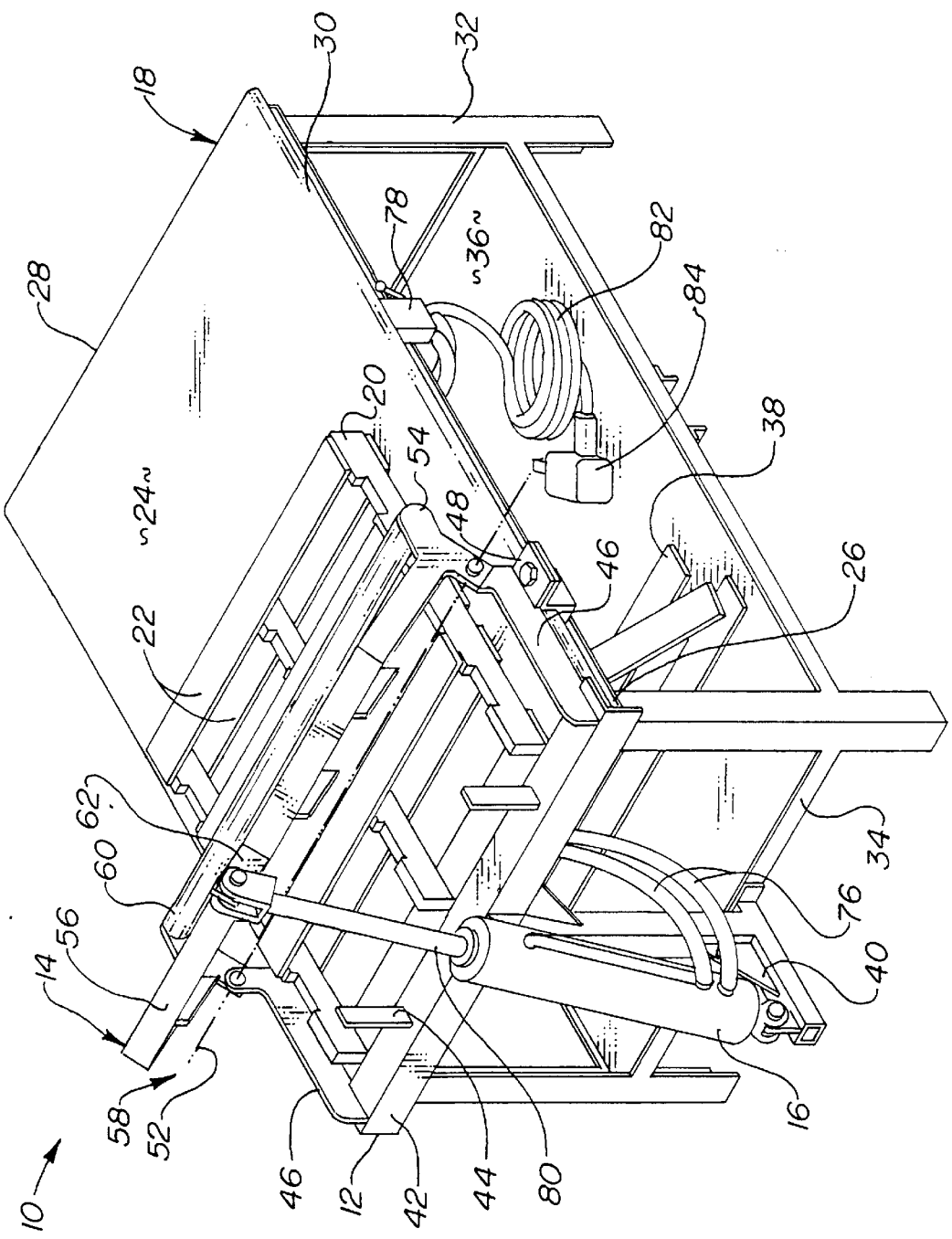
FIG. 2 is a perspective view of an end board remover embodying the present invention, in a second, raised position.
Figure 5:
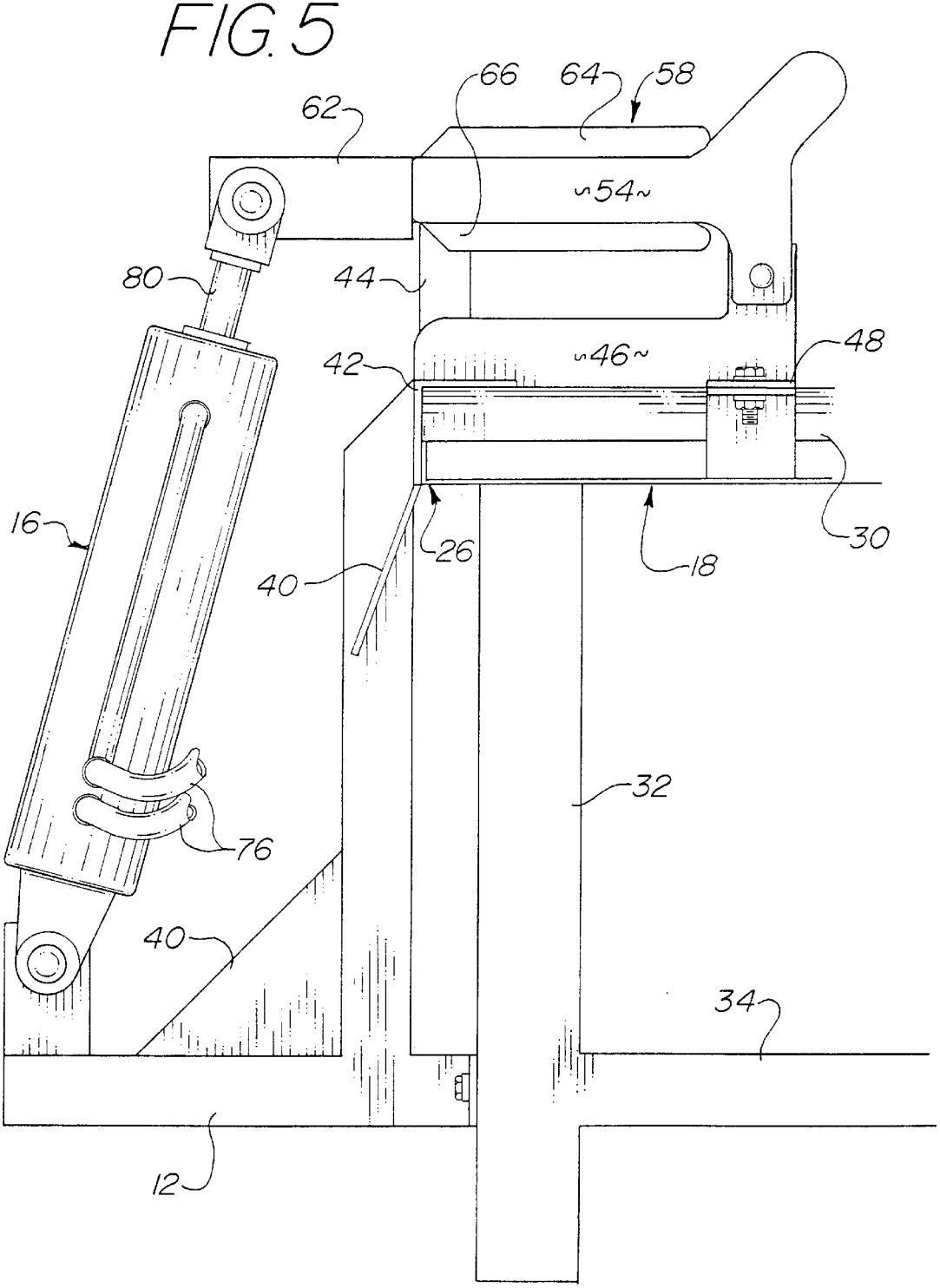
FIG. 5 is an enlarged, side elevational view of an end board remover of the present invention

Referring to FIG. 1, the numeral 10 refers in general to an end board remover of the present invention, comprising a frame 12, an arm assembly 14 and a power source 16. As also shown in FIGS. 1 and 2, the apparatus is adapted to be secured to a table 18 which is used to support a pallet 20 having an end board 22 to be removed. The table 18 has a surface 24, front 26 and rear 28 ends, sides 30, legs 32, crossmembers 34 and may have a lower shelf 36 for convenient storage of replacement boards or slats 38.

The frame 12 has lower, middle and upper portions. A rear end of the lower portion is secured to the crossmember 34, and a front end supports and pivotally secures the power source 16, preferably a pneumatic cylinder. The middle portion extends substantially vertically between and connects the lower and upper portions, extending parallel to the legs 32 at approximately the middle of the front end 26 of the table 18. Bracing 40 may be used to provide additional support and stability. An upper end of the middle portion is angled upwardly from front to rear at an angle of approximately 45° to avoid interfering with the rotation of the pneumatic cylinder 16. The upper portion has an L-shaped member 42 adapted to extend along the front end 26 of the table 18 so that an upper leg rests substantially horizontally on the surface 24 and the lower leg extends substantially vertically along the front end 26 of the table 18. A front end of the upper leg is affixed to a top end of the lower leg to form and edge that extends substantially horizontally, parallel to and near the front end 26 of the table 18.

Planar stops 44 are secured to and extend vertically from the upper leg, and guides 46 are secured to upper leg near each side 30 of the table 18 and extend horizontally, parallel to the table sides 30. Flanges 48 are secured to the bottom of each guide 46 near its rear end for securing the guide 46 to the table 18 or to a bracket for securing the guide 46 to the table 18. An aperture 50 is provided through an upper portion of each guide 46 near its rear end for pivotally securing the arm assembly 14 to the frame 12. An axis passing through the center of the apertures 50 forms an axis of rotation 52 of the arm assembly 14 relative to the frame 12 and table 18, and the apertures 50 are disposed so that the axis 52 is aligned substantially parallel to the front end 26 of the table 18 and is disposed approximately 9½ inches from the front end 26 of the table 18 and approximately 2⅝ inches above the surface 24.

The arm assembly 14 has sides 54, a beam 56, arms 58, a restraining bar 60 and a tongue or connector 62. The beam 56 is preferably a 2×2×3/16 inch square tube that is secured between front ends of the sides 54 so that it extends substantially parallel to the front end 26 of the table 18. A connector 62 is affixed to and extends forward from a front face of beam 56 at the middle of the beam to provide a convenient location for pivotally attaching the pneumatic cylinder 16 to the arm assembly 14. The restraining bar 60 is preferably a 1½ inch schedule 40 pipe that is secured between rear ends of the sides 54 so that it extends substantially parallel to the front end 26 of the table 18.

Each arm has an upper member 64 and a lower member 66 separated by a groove 68 that extends from the rear or distal end of the arm through a substantial portion of the length of the arm to provide a space of approximately 1 inch between the upper and lower members 64 and 66 for receiving an end board or slat 22 of a pallet 20. On each arm 58, the upper, rear surface of the lower member 66 and the lower, rear surface of the upper member 64 are angled or beveled to help guide an end board 22 between the members 64 and 66. A front or proximal portion of each arm 58 is affixed to rear portions of the beam 56, and the front portion of each arm 58 has a shallow rectangular groove 70 that is sized to mate with top, rear and bottom faces of the beam 56 to provide added support and stability. In the preferred embodiment, four arms 58 are symmetrically spaced along the beam 56, disposed at intervals to avoid interfering with the stringers of a pallet 20 as the pallet is positioned for disassembly. The beam 56 is approximately 46 inches long, and the arms 58 are spaced at 7 inches, 20 inches, 26 inches and 39 inches from an end of the beam.

The sides 54 maintain the beam 56 in a desired orientation remote from the restraining bar 60. Each side 54 is adapted to extend substantially parallel to and above the sides 30 of the table 18. A lower rear portion of each side 54 has an aperture 72, that is aligned with the corresponding aperture 50 of the guides 46, and bolts, pins or other suitable connectors pivotally secure the sides 54, and therefore the arm assembly 14, to the guides 46 so that the arm assembly 14 may be pivoted relative to the table 18 and surface 24. In the preferred embodiment, the sides 54 are pivotally secured to the guides 46 so that the axis of rotation 52 of the arm assembly 14 is approximately 9½ inches rearward of the front end 26 of the table 18 and is approximately 2⅝ inches above the surface 24 of the table 18.

The power source 16 is preferably a pneumatic cylinder, preferably with a 4 inch bore and 12 inch stroke. A source of pressurized air is supplied via tubing 76 to power the pneumatic cylinder 16, and a switch 78, located near the rear end 28 of the table 18, is used to operate the cylinder 16. The pressurized air is typically supplied within the range of approximately 115 to 125 psi, although higher or lower pressures may be used as desired. The cylinder 16 is pivotally secured to the lower portion of the frame 12 and is pivotally secured to the connector 62. The cylinder 16 has a rod 80 attached to an internal piston, and the cylinder 16 is connected to the frame 12 and arm assembly 14 so that when the rod 80 is disposed in a retracted position, the arm assembly 14 is in a first, lowered position for receiving a pallet 20, and when the rod 80 is extended, the arm assembly 14 is rotated to a second, raised position for prying the end board 22 from the pallet 20.

When the arm assembly 14 is in the first position, the arms 58 are disposed substantially horizontally and are disposed for all or substantially all of their length between the front end 26 of the table 18 and the axis of rotation 52. The arms 58 are elevated above the surface 24 a sufficient distance to receive a top end board 22 of a pallet 20. The end board 22 is received in grooves 68 and supported by lower members 66. The arms 58 are disposed at a sufficient height above the surface 24 to receive top end boards from pallets of many different sizes, and the lower members 66 will typically support a front portion of the pallet 20 slightly above the surface 24 of the table 18 when the end board 22 is positioned within the groove 68. In the first position, the restraining bar 60 is aligned above the beam 56 and arms 58 and rearward of the axis of rotation 52.

The arm assembly 14 may be rotated about the axis of rotation 52 to the second, raised position. In the second position, the rod 80 is extended, and the restraining bar 60 is disposed below the beam and below at least the proximal or front ends of the arms 58. The arms 58 are angled downwardly from front to rear.

The table 18 may also be supplied with tubing 82 for supplying pressurized air to a pneumatic nail gun 84 to create a convenient workstation for quickly and efficiently removing and replacing end boards from pallets.

In operation, an operator places a pallet 20 on the table surface 24 rearward of the pallet end board remover 10 with the end board 22 to be removed on the upper side closest to the front end 26 of the table 18. If the arm assembly 14 is not in the first position, the operator places it in the first position. The operator slides the pallet 20 across the surface 24 toward the front of the table 18 and the arms 58 and, if necessary, lifts the front end of the pallet 20 slightly as the end board 22 reaches the arms 58 to position the end board within the groove 68, between upper and lower members 64 and 66. For most pallets, the lower members 66 contact and support the end board 22 so that the front end of the pallet 20 is supported slightly above the surface 24. The guides 46 help align the pallet so that the stringers are parallel to the guides 46 and sides 30 of the table 18 and so that the end board 22 is parallel to the front end 26 of the table and perpendicular to the arms 58. The operator pushes the pallet 20 forward until it contacts the stops 44 or the front ends of the grooves 68.

The operator then turns the switch 78 to supply pressurized air to the cylinder 16 for extending the rod 80 and rotating the arm assembly 14 to the second position. Initially, the arms 58 lift the front end of the pallet 20 as the arms rotate upwardly and rearwardly. As the arm assembly 14 rotates, the restraining bar 60 rotates downwardly and rearwardly. After rotating a short distance, the restraining bar 60 contacts the pallet 20 rearward of the end board 22 and supplies downward force to the pallet, forcing the pallet back down to the surface 24 as the arms 58 lift, rotate and pry the end board 22 upwardly to pry the end board 22 from the pallet 20. After the end board 22 is pried from the pallet 20, the arm assembly 14 may be returned to the first position to prepare for removing another end board 22. The process of sliding the pallet 20 into position, activating the cylinder 16 and removing the end board 22 may be accomplished in a matter of a few seconds. In fact, once the pallet 20 is slid into position, the cycle time for rotating the arm assembly 14 and removing the end board 22 can be less than two seconds.

After removing the end board 22, the operator will typically place the removed board in a location to be reused or discarded depending on its condition and will slide the pallet 20 rearward of the apparatus. The operator then typically obtains a replacement board 38 from the shelf 36, places it in position on the stringers and uses the nail gun 84 to nail the replacement board 38 to the pallet 20.

Other modifications, changes and substitutions are intended in the foregoing, and in some instances, some features of the invention will be employed without a corresponding use of other features. For example, although a pneumatic cylinder 16 is preferred, any suitable power source may be used, such as a hydraulic cylinder or electric engine. Also, although the arm assembly 14 and power source 16 are described as being pivotally secured to the frame 12, a frame need not be used, and the arm assembly 14 and power source 16 may be secured to any suitable object. For example, the arm assembly 14 may be pivotally secured directly to the table 18. Further, the measurements and dimensions are given as illustrations of the preferred embodiment and should not be construed as limiting the scope of the invention. Also, although the arms 58 and restraining bar 60 are described as being part of an arm assembly 14, there is no requirement that they be connected, that they receive power from the same source or that they rotate about the same axis of rotation. Further still, although the arms 58 are described as having upper and lower members 64 and 66 separated by a groove 68, the arms 58 need not have upper and lower members. As another example, the restraining bar 60 may extend across only a portion of the width of the table 18, need not be parallel to the front of the table and need not be affixed to both sides.

Accordingly, it is appropriate that the appended claims be construed broadly and in a manner consistent with the scope of the invention

I claim:

1. A pallet end board remover, comprising:

a surface for supporting a pallet;

a plurality of arms disposed to pivot about a first axis near said surface;

a restraining bar disposed to pivot about a second axis near said surface; and a power source operatively connected to each of said plurality of arms and to said restraining bar for rotating said plurality of arms and said restraining bar between a first position for receiving said pallet having an end board and a second position in which said restraining bar is in contact with an upper surface of said pallet for prying said end board from said pallet.

2. The apparatus of claim 1 further comprising:

a beam, each of said plurality of arms being secured to said beam at desired intervals; and a side member disposed to pivot about said first axis, said beam and said restraining bar being secured to said side member so that said first axis coincides with said second axis and so that said side member maintains said beam in a desired orientation remote from said restraining bar.

3. The apparatus of claim 2 wherein said power source is a pneumatic cylinder.

4. The apparatus of claim 3 wherein said pneumatic cylinder has a rod attached to an internal piston and wherein in said first position, said rod is in a retracted position, and in said second position, said rod is in an extended position.

5. The apparatus of claim 1 wherein in said first position, said restraining bar is disposed above each of said plurality of arms.

6. The apparatus of claim 5 wherein in said first position, each of said plurality of arms is disposed substantially horizontally.

7. The apparatus of claim 2 wherein each of said plurality of arms has a proximal end secured to said beam and wherein in said second position, said restraining bar is disposed below said proximal end of each of said plurality of arms.

8. The apparatus of claim 2 wherein in said first position, said restraining bar is disposed above said beam and in said second position said restraining bar is disposed below said beam.

9. The apparatus of claim 1 wherein each of said plurality of arms has an upper member and a lower member.

10. The apparatus of claim 1 wherein in said first position each of said plurality of arms is disposed to support a front end of a pallet above said surface.

11. The apparatus of claim 1 wherein each of said plurality of arms and said restraining bar are disposed so that said first axis coincides with said second axis.

12. The apparatus of claim 11 wherein said surface is a table surface and said first axis is disposed remotely from a front and a rear end of said table.

13. The apparatus of claim 12 wherein said first axis is disposed above said table surface.

14. The apparatus of claim 12 wherein in said first position each of said plurality of arms is disposed above said table surface and between said first axis and a front end of said table.

15. A pallet end board remover, comprising:

a frame adapted to be secured to a table;

a plurality of arms pivotally secured to said frame;

a restraining bar pivotally secured to said frame; and a power source pivotally secured to said frame and operatively connected to said plurality of arms and said restraining bar for rotating said plurality of arms and said restraining bar between a first position for receiving a pallet having an end board and a second position in which said restraining bar is in contact with an upper surface of said pallet for prying said end board from said pallet.

16. The apparatus of claim 15 wherein said power source is a pneumatic cylinder, said pneumatic cylinder having a rod attached to an internal piston and wherein in said first position, said rod is disposed in a retracted position and in said second position, said rod is disposed in an extended position.

17. The apparatus of claim 16 wherein:

said frame has a member adapted to extend along a front end of a table; and said plurality of arms and said restraining bar pivot about an axis, said axis being disposed remotely from said member of said frame.

* * * * *